United States Patent
Lee

(10) Patent No.: US 9,756,799 B2
(45) Date of Patent: Sep. 12, 2017

(54) AQUAPONIC SYSTEM

(71) Applicant: Shek Tat Arthur Lee, N.T. (HK)

(72) Inventor: Shek Tat Arthur Lee, N.T. (HK)

(73) Assignee: Contech Solutions Limited, N.T. (HK)

( * ) Notice: Subject to any disclaimer, the term of this patent is extended or adjusted under 35 U.S.C. 154(b) by 99 days.

(21) Appl. No.: 14/660,928

(22) Filed: Mar. 17, 2015

(65) Prior Publication Data

US 2016/0262322 A1 Sep. 15, 2016

(30) Foreign Application Priority Data

Mar. 9, 2015 (CN) .......................... 2015 1 0101341

(51) Int. Cl.
| | |
|---|---|
| *A01G 31/00* | (2006.01) |
| *A01G 31/02* | (2006.01) |
| *A01K 63/00* | (2017.01) |
| *A01K 63/04* | (2006.01) |

(52) U.S. Cl.
CPC ............ *A01G 31/02* (2013.01); *A01K 63/003* (2013.01); *A01K 63/04* (2013.01); *A01K 63/045* (2013.01); *A01K 63/047* (2013.01); *Y02P 60/216* (2015.11)

(58) Field of Classification Search
CPC . A01G 31/02; A01G 2031/006; A01G 63/003
USPC ................................................ 47/62 A, 62 R
See application file for complete search history.

(56) References Cited

U.S. PATENT DOCUMENTS

| | | | | |
|---|---|---|---|---|
| 4,077,158 | A * | 3/1978 | England ................. | A01G 31/02 119/200 |
| 5,127,366 | A * | 7/1992 | Kim ....................... | A01G 31/02 119/246 |
| 6,578,319 | B1 * | 6/2003 | Cole ....................... | A01G 31/02 47/17 |
| 8,256,382 | B2 * | 9/2012 | Ba-abbad ............... | A01G 31/00 119/450 |
| 2008/0251028 | A1 * | 10/2008 | Grad ..................... | A01K 63/003 119/248 |
| 2009/0301399 | A1 * | 12/2009 | Brown ................... | A01G 31/02 119/226 |
| 2010/0031893 | A1 * | 2/2010 | Bodlovich ............... | C02F 3/32 119/227 |
| 2013/0047508 | A1 * | 2/2013 | Toone ..................... | A01G 31/02 47/62 R |
| 2013/0098303 | A1 * | 4/2013 | Jones ...................... | A01G 31/00 119/215 |

(Continued)

*Primary Examiner* — Monica Williams
*Assistant Examiner* — Aaron Rodziwicz

(57) ABSTRACT

An aquaponic system, having at least one farming section; each farming section has an aquaculture unit, a vegetable farming unit and a water circulation unit; the aquaculture unit has an outer tank and an aquaculture tank inside the outer tank; the vegetable farming unit has a vegetable farming column and a water collection tank at a bottom part thereof; the water circulation unit has a filter tank, a water pump, and at least one guiding pipe extending from the aquaculture tank to the vegetable farming column; a water inlet of the filter tank is connected with a water outlet of the aquaculture tank; a water outlet of the filter tank is connected with a water inlet of the aquaculture tank; one end of the water pump is connected with the water collection tank, another end of the water pump is connected with the aquaculture tank.

10 Claims, 4 Drawing Sheets

(56) References Cited

U.S. PATENT DOCUMENTS

| | | | |
|---|---|---|---|
| 2013/0152469 A1* | 6/2013 | Kao | A01G 31/02 47/62 R |
| 2013/0206077 A1* | 8/2013 | Castranova | A01K 1/03 119/217 |
| 2014/0223818 A1* | 8/2014 | Coghlan | A01G 31/02 47/62 R |
| 2014/0223819 A1* | 8/2014 | Coghlan | A01K 63/045 47/62 R |

* cited by examiner

AQUAPONIC SYSTEM

BACKGROUND OF THE INVENTION

The present invention relates to a kind of farming device, and more specifically relates to an aquaponic system.

Aquaculture and vegetable farming are important parts of modern agricultural activities. In conventional agricultural activities, aquatic organisms are raised in a mud pond while vegetables are cultivated on a farmland. In order to reduce costs and increase economic benefits, different types of devices not using a mud pond and devices not using a farmland have been developed for raising aquatic organisms and cultivating vegetables. However, in the existing prior arts, an aquaculture device and a vegetable farming device are mutually independent from each other and cannot be organically combined to increase production efficiency. Furthermore, an existing aquaculture device is relatively costly to manufacture.

BRIEF SUMMARY OF THE INVENTION

In view of the aforesaid disadvantages now present in the prior art, the present invention provides an aquaponic system which can raise aquatic organisms and cultivate vegetables at the same time. The present invention also has the advantage of low manufacturing costs.

The present invention adopts the following technical proposal:

An aquaponic system, characterized in that, it comprises at least one farming section; each of the at least one farming section comprises an aquaculture unit, a vegetable farming unit and a water circulation unit; wherein:

The aquaculture unit comprises an outer tank constituted by a container and an aquaculture tank inside the outer tank;

The vegetable farming unit comprises a vegetable farming column and a water collection tank at a bottom part of the vegetable farming column;

The water circulation unit comprises a filter tank, a water pump, and at least one guiding pipe, wherein the at least one guiding pipe extends downwardly in an inclined manner from the aquaculture tank to a top part of the vegetable farming column; a water inlet of the filter tank is connected with a water outlet of the aquaculture tank; a water outlet of the filter tank is connected with a water inlet of the aquaculture tank; one end of the water pump is connected with the water collection tank via a water pipe, another end of the water pump is connected with the aquaculture tank.

In a preferred embodiment of the present invention, the at least one farming section comprises multiple farming sections; outer tanks of aquaculture units of the farming sections are stackable from bottom to top; vegetable farming columns of the farming sections are also stackable from bottom to top; each of the farming sections is capable to function independently; stackable outer tanks and stackable vegetable farming columns can enlarge the scale of production and at the same time reduce as much as possible the space being occupied. Outer tanks formed by containers can also facilitate stacking and attain a compact structure. In the course of use, all water which has entered the vegetable farming columns flows downwardly to the water collection tank and is then being transmitted back to the respective aquaculture tanks to achieve an organic combination of the farming sections.

Apart from aquaculture units of the farming sections, the present invention also comprises additional aquaculture units which are in the same quantity as the aquaculture units of the farming sections. Outer tanks of the additional aquaculture units are stackable from bottom to top, and are juxtaposed beside the aquaculture units of the farming sections. Aquaculture tanks of the additional aquaculture units have water outlet ends connecting with water inlet ends of filter tanks which have water outlet ends connecting with water inlet ends of the aquaculture tanks of the additional aquaculture units. The filter tanks which have water outlet ends connecting with the water inlet ends of the aquaculture tanks of the additional aquaculture units are filter tanks in water circulation units of the farming sections which are at the same height level as the additional aquaculture units. Accordingly, aquaculture units are increased in number while there is no increase in number and scale of the vegetable farming columns. Therefore, the scale of aquaculture can be enlarged based on practical needs, and the additional aquaculture units and filter tanks thereof can realize their own water circulation so as to facilitate actual practice.

Moreover, the aquaponic system comprises two or more subsystems each constituted by plurality of the farming sections and plurality of the additional aquaculture units. As such, the scale of the aquaponic system can be enlarged to meet production requirements.

In a preferred embodiment of the present invention, the at least one guiding pipe extending from the aquaculture tank to the top part of the vegetable farming column in each of the farming sections comprises a plurality of guiding pipes so as to facilitate even distribution of water transmitted from the aquaculture tank to the vegetable farming column such that each part of the vegetable farming column receives water and nutrients evenly.

In a preferred embodiment of the present invention, the aquaculture tanks are provided with aeration devices which comprise aeration pipes provided in the aquaculture tanks and at least one blower connected with the aeration pipes. Aeration of water by the aeration devices facilitates the growth of aquatic organisms.

Preferably, the at least one blower comprises only one blower shared by all the aeration devices of all the aquaculture tanks so as to save the quantity of blowers to be provided and to facilitate piping arrangements.

In a preferred embodiment of the present invention, the aquaculture tanks are also provided with heat supply devices to ensure that water in the aquaculture tanks is maintained within a required range of temperature.

Specifically, the heat supply devices are electrical heating devices provided in the aquaculture tanks or hot water supply devices which supply hot water to the aquaculture tanks.

The aquaponic system of the present invention has the following working principle: aquatic organisms are raised in the aquaculture tanks of the aquaculture units; vegetables are cultivated on the vegetable farming columns of the vegetable farming units; wastes of the aquatic organisms in the aquaculture tanks are filtered by the filter tanks of the water circulation units; filtered water is rich in nutrients required for the growth of vegetables, and such filtered water is automatically diverted to the vegetable farming columns under guidance of the guiding pipes; such filtered water which is rich in nutrients flows along the vegetable farming columns from top to bottom to supply nutrients for the growth of vegetables; eventually, the water is collected in the water collection tank and then being transmitted by using the water pump from the water collection tank back to the aquaculture tanks, thereby recycling the water.

The present invention has the following advantages compared with existing prior arts:

1. The present invention integrates aquaculture and vegetable cultivation such that water rich in nutrients in the aquaculture tanks is fully utilized for supply to the vegetable farming columns. Therefore, the present invention achieves organic combination of aquaculture and vegetable cultivation and thus increases production efficiency.

2. The outer tanks of the aquaculture units are constituted by containers which have low costs and which can be easily stackable. Since containers already have strong frames for supporting weights, they can still be stackable steadily even they are loaded with aquaculture tanks which are filled with water and aquatic organisms.

BRIEF DESCRIPTION OF THE DRAWINGS

FIGS. 1-5 are schematic structural views of the aquaponic system according to a detailed embodiment of the present invention, in which:

FIG. 1 is a front elevational view;

FIG. 2 is a top plan view of the farming sections of the bottommost layer;

FIG. 3 is a left side view;

FIG. 4 is a structural view of an aquaculture tank and a filter tank;

FIG. 5 is a structural view of an aquaculture tank.

DETAILED DESCRIPTION OF THE INVENTION

The present invention is further described in detail below with reference to an embodiment and the accompanying figures. It should be noted that specific implementation of the present invention is not limited to the description herein.

Figure 1:
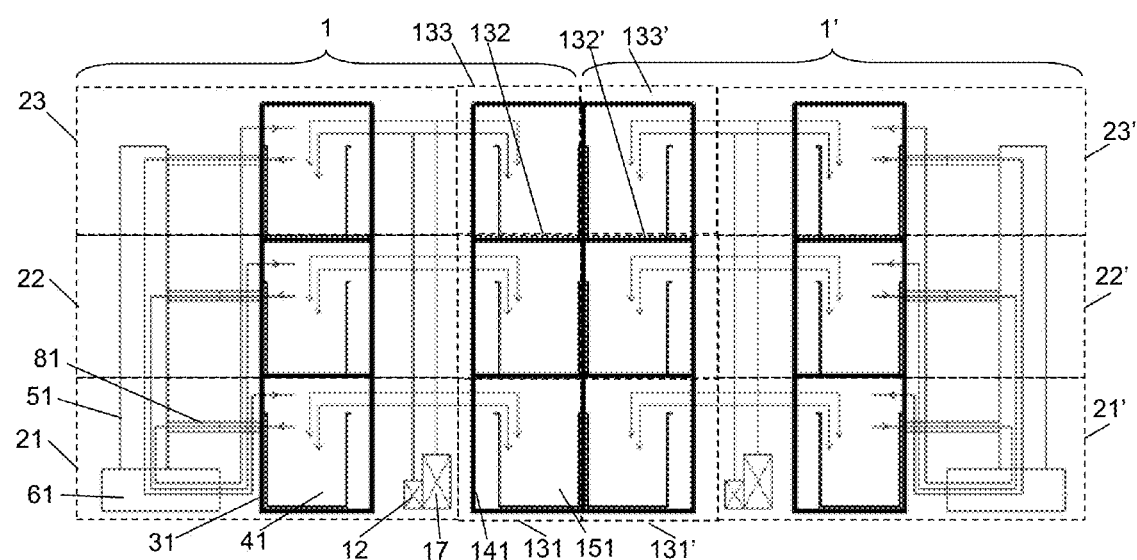
Figure 2:
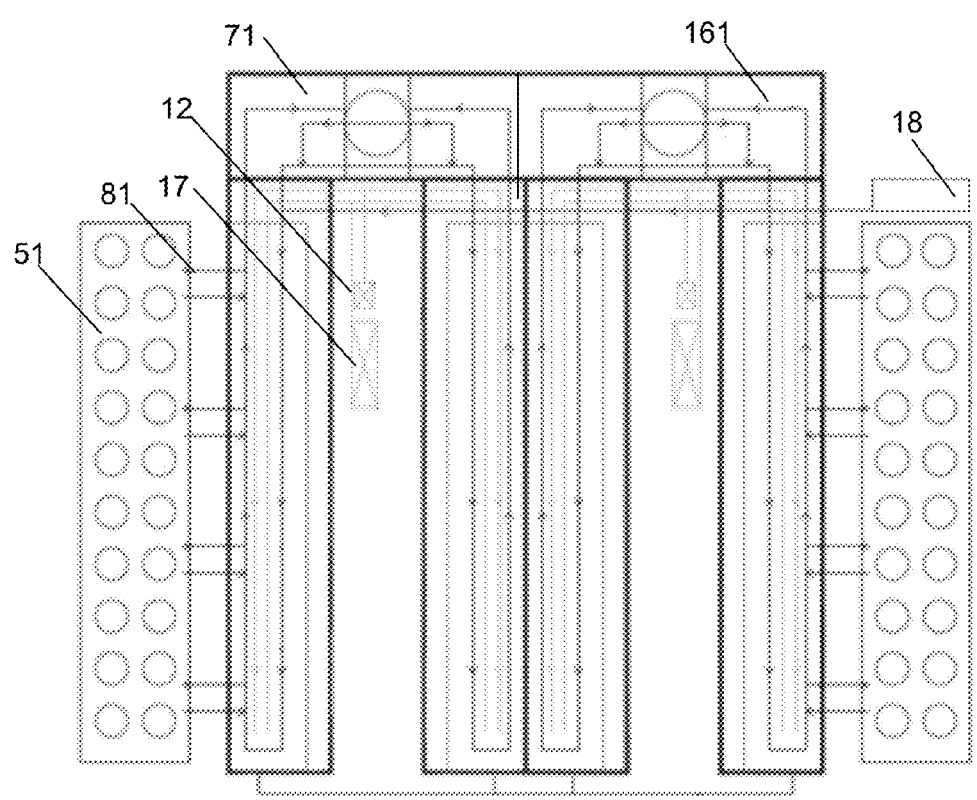
Figure 3:
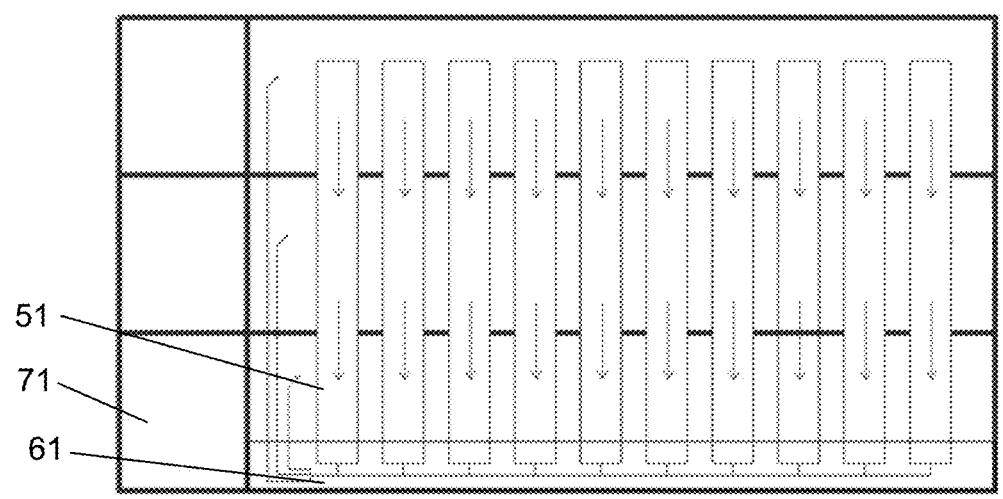
Figure 4:
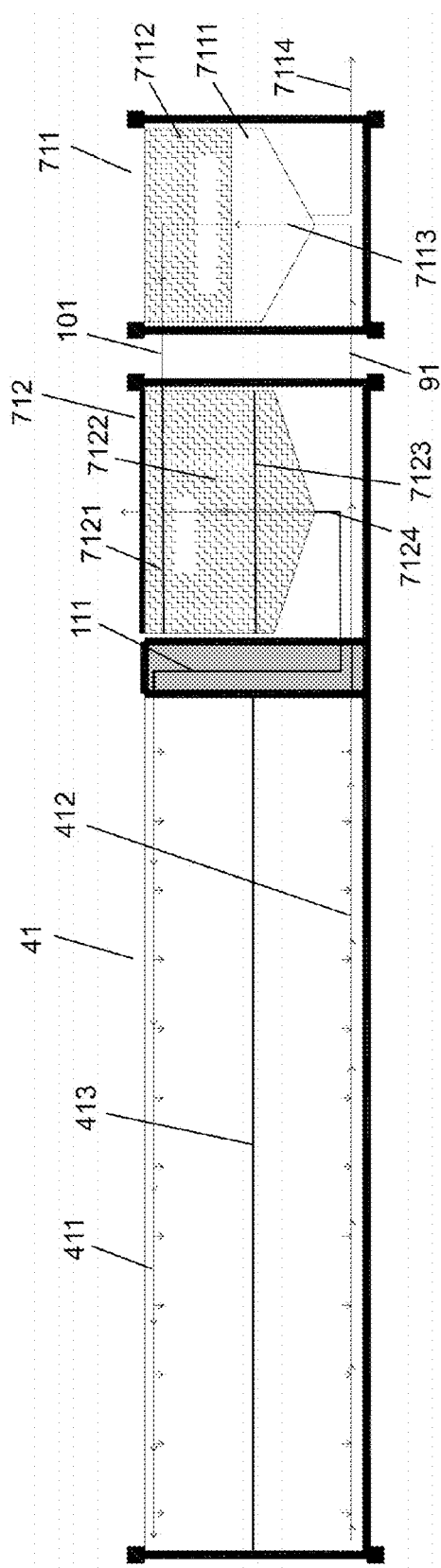
Figure 5:
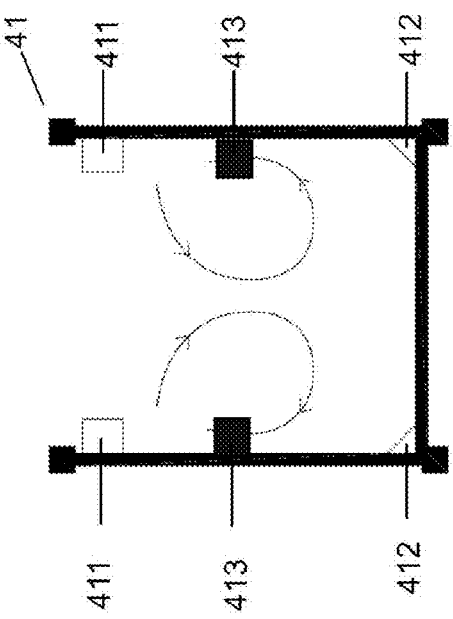

As shown in the figures, an aquaponic system of the current embodiment of the present invention comprises two farming subsystems 1, 1' (one on the left side and another one on the right side). Each of the two farming subsystems 1, 1' comprises three farming sections 21, 22, 23, 21', 22', 23' and three additional aquaculture units 131, 132, 133, 131', 132', 133'. All the farming sections 21, 22, 23, 21', 22', 23' are substantially the same in terms of structure. A farming section 21 of the farming sections is described in detail below. The farming section 21 comprises an aquaculture unit, a vegetable farming unit and a water circulation unit. The aquaculture unit comprises an outer tank 31 constituted by a container and an aquaculture tank 41 inside the outer tank 31. The vegetable farming unit comprises a vegetable farming column 51 and a water collection tank 61 at a bottom part of the vegetable farming column 51. The vegetable farming column 51 is a prior art feature attainable according to the teachings of prior arts and so its structure will not be described in detail herein. The water circulation unit comprises a filter tank 71, a water pump 18, and a guiding pipe 81, wherein the guiding pipe 81 extends downwardly in an inclined manner from the aquaculture tank 41 to a top part of the vegetable farming column 51 (although FIG. 1 shows horizontal extension of the guiding pipe 81, the guiding pipe 81 in actual practice should extend downwardly in an inclined manner as described). A water inlet of the filter tank 71 is connected with a water outlet of the aquaculture tank 41. A water outlet of the filter tank 71 is connected with a water inlet of the aquaculture tank 41. One end of the water pump is connected with the water collection tank 61 via a water pipe, another end of the water pump is connected with the aquaculture tank 41.

In the current embodiment, the aquaculture tank 41 and the fitter tank 71 are implemented according to the disclosed Chinese patent application titled "Container module eco-cycle aquaculture system" under the publication number CN103960190A. In particular, aquaculture tank water inlet pipes 411 are provided along two longitudinal sides of a top part of the aquaculture tank 41 and are connected with a water inlet end of the aquaculture tank 41. The aquaculture tank water inlet pipes 411 are provided with evenly distributed water outlet pores (not shown in the figures) and the aquaculture tank water inlet pipes 411 communicate with the guiding pipe 81. A quantity of the guiding pipe 81 may be more than one so as to facilitate even distribution of water transmitted from the aquaculture tank 41 to the vegetable farming column 51 such that each part of the vegetable farming column 51 receives water and nutrients evenly. Aquaculture tank water outlet pipes 412 are provided along two longitudinal sides of a bottom part of the aquaculture tank 41 and are connected with a water outlet end of the aquaculture tank 41. The aquaculture tank water outlet pipes 412 are provided with evenly distributed water suction pores (not shown in the figures). Aquaculture tank aeration pipes 413 are provided along two longitudinal sides of a middle part of the aquaculture tank 41 for water aeration via an aeration device (not shown in the figures) to facilitate the growth of aquatic organisms. The filter tank 71 comprises a biological filter 712 and a mechanical filter 711. A bottom part of the mechanical fitter 711 is provided with a sediment basin 7111. An upper part of the sediment basin 7111 is provided with multiple filter layers 7112. Each of the filter layers 7112 has a filter mesh size which decreases gradually from bottom to top. The mechanical filter 711 is also provided with a mechanical filter water outlet pipe 7113. A lower part of the mechanical filter water outlet pipe 7113 being a water inlet end of the filter tank 71 is connected with the aquaculture tank water outlet pipes 412 via a first longitudinal water pipe 91. An upper opening of the mechanical filter water outlet pipe 7113 is positioned between the sediment basin 7111 and the filter layers 7112. The water level of the aquaculture tank 41 is maintained at a level higher than the water level of the mechanical filter 711, therefore water inside the aquaculture tank 41 is automatically diverted to the mechanical filter 711 through the first longitudinal water pipe 91 and the mechanical filter water outlet pipe 7113 according to the working principle of communicating vessels wherein liquid balances out to the same level in all the vessels which are interconnected at the bottom. A mechanical fitter drainage pipe 7114 is provided at the bottom part of the mechanical filter 711 to drain away wastes deposited in the sediment basin 7111. A water inlet pipe 7121 provided at an upper part of the biological filter 712 is connected with an upper part of the mechanical filter 711 via a second longitudinal water inlet pipe 101. Water inside the mechanical filter 711 overflows to the biological filter 712 through the second longitudinal water inlet pipe 101. A middle part of the biological filter 712 is provided with nitrifying bacteria carriers 7122. A lower part of the biological filter 712 is provided with a biological filter aeration pipe 7123. The bottom part of the biological filter 711 is provided with a water outlet 7124 which connects a bottom part of a third vertical water pipe 111. The biological filter aeration pipe 7123 of the biological filter 712 facilitates vertical circulation of water in the biological filter 712 providing more time for the water to contact with the nitrifying bacteria and thus enhancing the effect of biological filtration. In the current embodiment, the water inlet pipe 7121 of the biological filter 712 is in form of a spray device, thereby allowing water to enter the biological filter 712 by dripping, so that the water can have sufficient time to contact with the nitrifying bacteria. The nitrifying bacteria carriers 7122 are in form of ribbons for increasing surface area, thereby increasing contact between the water and the nitrifying bacteria. The bottom part of the biological filter 712 is connected with the aquaculture tank water inlet pipes 411 at the upper part of the aquaculture tank 41 via the third vertical water pipe 111. Water inside the biological filter 712 is automatically diverted to the third vertical water pipe 111 according to the working principle of communicating vessels wherein liquid balances out to the same level in all the vessels which are interconnected at the bottom. A third vertical water pipe aeration device (not shown in the figures) is provided in the third vertical water pipe 111 which enables water at the upper part of the third vertical water pipe 111 together with bubbles produced from aeration to overflow to the aquaculture tank water inlet pipes 411 of the aquaculture tank 41. The third vertical water pipe aeration device comprises a blower and a plurality of aeration device aeration pipes connected with the blower. These aeration device aeration pipes connect the third vertical water pipe 111 so as to attain a better control of the intensity of aeration. The aeration devices of all the aquaculture tanks (e.g. reference sign 41), the aeration devices of all the third vertical water pipes and the aeration pipes (e.g. reference sign 7123) of all the biological filters (e.g. reference sign 712) in all the farming sections (e.g. reference signs 21, 22 and 23) share the same blower 12 so as to save the number of blowers to be provided and to facilitate piping arrangements.

As shown in the figures, the outer tanks (e.g. reference sign 31) in the farming sections 21, 22, 23, 21', 22', 23' are stackable from bottom to top and the vegetable farming columns (e.g. reference sign 51) of the farming sections 21, 22, 23, 21', 22', 23' are also stackable from bottom to top. Each of the farming sections 21, 22, 23, 21', 22', 23' can function independently. Stackable outer tanks (e.g. reference sign 31) and stackable vegetable farming columns (e.g. reference sign 51) can enlarge the scale of production and at the same time reduce as much as possible the space being occupied. Outer tanks (e.g. reference sign 31) formed by containers can also facilitate stacking and attain a compact structure. In the course of use, all water which has entered the vegetable farming columns (e.g. reference sign 51) flows downwardly to the water collection tank 61 and is then being transmitted back to the respective aquaculture tanks (e.g. reference sign 41) to achieve an organic combination of the farming sections 21, 22, 23, 21', 22', 23'.

As shown in the figures, outer tanks (e.g. reference sign 141) of the additional aquaculture units 131, 132, 133, 131', 132', 133' are stackable from bottom to top, and are juxtaposed beside the aquaculture units of the farming sections 21, 22, 23, 21', 22', 23'. Aquaculture tanks (e.g. reference sign 151) of the additional aquaculture units 131, 132, 133, 131', 132', 133' have water outlet ends connecting with water inlet ends of filter tanks (e.g. reference sign 161) which have water outlet ends connecting with water inlet ends of the aquaculture tanks (e.g. reference sign 151) of the additional aquaculture units 131, 132, 133, 131', 132', 133'. The filter tanks (e.g. reference sign 161) are the filter tanks (e.g. reference sign 71) in the water circulation units of the farming sections 21, 22, 23, 21', 22', 23' which are at the same height level as the additional aquaculture units 131, 132, 133, 131', 132', 133'. In an exception that the aquaculture tanks (e.g. reference sign 151) of the additional aquaculture units 131, 132, 133, 131', 132', 133' are not connected with the guiding pipes (e.g. reference sign 81), structures of the additional aquaculture units 131, 132, 133, 131', 132', 133' and connections between the additional aquaculture units 131, 132, 133, 131', 132', 133' and the filter tanks (e.g. reference sign 71) are otherwise substantially the same as the structures of the aquaculture tanks (e.g. reference sign 41) and the connections between the aquaculture tanks (e.g. reference sign 41) and the filter tanks 71 as described above, and so will not be repeated herein. Accordingly, aquaculture units are increased in number while there is no increase in number and scale of the vegetable farming columns. Therefore, the scale of aquaculture can be enlarged based on practical needs, and the additional aquaculture units and filter tanks can realize their own water circulation so as to facilitate actual practice.

As shown in the figures, the aquaculture tanks are also provided with heat supply devices 17 to ensure that water in the aquaculture tanks (e.g. reference signs 41, 151) is maintained within a required range of temperature. The heat supply devices 17 are hot water supply devices which supply hot water to the aquaculture tanks (e.g. reference signs 41, 151).

As shown in the figures, the aquaponic system has the following operation principle: aquatic organisms are raised in the aquaculture tanks (e.g. reference signs 41, 151) of the aquaculture units and the additional aquaculture units 131, 132, 133, 131', 132', 133'; vegetables are cultivated on the vegetable farming columns (e.g. reference signs 51) of the vegetable farming units; since the water in the aquaculture tanks (e.g. reference signs 41, 151) of the aquaculture units and the additional aquaculture units 131, 132, 133, 131', 132', 133' is maintained at a level higher than the water level of the mechanical filters (e.g. reference sign 711), water together with excrement of the aquatic organisms and unconsumed feed inside the aquaculture tanks (e.g. reference signs 41, 151) are sucked into the aquaculture tank water outlet pipes (e.g. reference sign 412) under the suction effect of the suction pores of the aquaculture tank water outlet pipes (e.g. reference sign 412) and are then automatically diverted to the mechanical filters (e.g. reference sign 711) through the first longitudinal water pipes (e.g. reference sign 91) according to the working principle of communicating vessels wherein liquid balances out to the same level in all the vessels which are interconnected at the bottom; the drainage passes through the filter layers (e.g. reference sign 7112); the filtered wastes are sunk in the sediment basins (e.g. reference sign 7111) and are then being discharged through the mechanical filter drainage pipes (e.g. reference sign 7114) at the bottom parts of the sediment basins (e.g. reference sign 7111); water filtered by the mechanical filters (e.g. reference sign 711) is diverted from the upper parts of the mechanical filters (e.g. reference sign 711) to the biological filters (e.g. reference sign 712) through the second longitudinal water inlet pipes (e.g. reference sign 101) and then being dripped into the nitrifying bacteria carriers (e.g. reference sign 7122) in the middle parts of the biological filters (e.g. reference sign 712) through the water inlet pipes (e.g. reference sign 7121) of the biological filters (e.g. reference sign 712). The aeration pipes (e.g. reference sign 7123) of the biological filters (e.g. reference sign 712) facilitate vertical circulation of water in the biological filters (e.g. reference sign 712), thereby increasing the contacting time between the water and the nitrifying bacteria and thus enhancing the effects of the biological filtration. Water filtered by the biological filters (e.g. reference sign 712) is then diverted from the bottom parts of the biological filters (e.g. reference sign 712) to the bottom parts of the third vertical water pipes (e.g. reference sign 111) through the water outlets (e.g. reference sign 7124); according to the working principle of communicating vessels wherein liquid balances out to the same level in all the vessels which are interconnected at the bottom, water in the biological filters (e.g. reference sign 712) is automatically diverted to the third vertical water pipes (e.g. reference sign 111); although the water levels of the third vertical water pipes (e.g. reference sign 111) are not sufficient to allow the water to flow out to the aquaculture tank water inlet pipes (e.g. reference sign 411), aeration of water in the upper parts of the third vertical water pipes (e.g. reference sign 111) by the aeration devices not only enables the water in the upper parts of the third vertical water pipes (e.g. reference sign 111) to overflow to the aquaculture tanks (e.g. reference sign 41, 151) of the aquaculture units and additional aquaculture units 131, 132, 133, 131', 132', 133' together with bubbles formed by the aeration, but at the same time also increases the volume of dissolved oxygen in the water and thereby ensuring that water flowing into the aquaculture tanks (e.g. reference sign 41, 151) has sufficient dissolved oxygen. Water in the aquaculture tank water inlet pipes (e.g. reference sign 411) of the aquaculture units and additional aquaculture units 131, 132, 133, 131', 132', 133' are sprayed into the aquaculture tanks (e.g. reference sign 41) through the water outlet pores. As described above, water as well as the excrement of the aquatic organisms and the unconsumed feeds in the aquaculture tanks (e.g. reference sign 41, 151) of the aquaculture units and the additional aquaculture units 131, 132, 133, 131', 132', 133' are sucked into the aquaculture tank water outlet pipes (e.g. reference sign 412) and the drainage is automatically diverted to the mechanical filters (e.g. reference sign 711) through the first longitudinal water pipes (e.g. reference sign 91), thereby completing a water circulation cycle.

As described above, water in the aquaculture tank water inlet pipes (e.g. reference sign 411) of the aquaculture units are sprayed into the aquaculture tanks (e.g. reference sign 41) through the water outlet pores. Also, water will be automatically diverted to the vegetable farming columns (e.g. reference sign 51) through the guiding pipes (e.g. reference sign 81) connected with the aquaculture tanks (e.g. reference sign 41). Amount of water being diverted to the vegetable farming columns (e.g. reference sign 51) can be controlled by devices such as water gates to ensure that sufficient but not more than sufficient amount of water is supplied for absorption by all the vegetables. Water rich in nutrients flows along the vegetable farming columns (e.g. reference sign 51) from top to bottom to supply nutrients for the growth of vegetables. Eventually, water is collected in the water collection tank 61 and then being transmitted by using the water pump from the water collection tank 61 back to the aquaculture tank water inlet pipes (e.g. reference sign 411) in the aquaculture tanks (e.g. reference sign 41) of the aquaculture units, thereby recycling the water.

A more preferred embodiment of the present invention is described above. However, implementation of the present invention should not be limited to the description herein. Any changes, modification, replacement, combination and simplification made without deviating from the essence and principle of the present invention should be considered effective alternatives and should therefore fall within the scope of protection of the present invention.

What is claimed is:

1. An aquaponic system, characterized in that, the aquaponic system comprises at least one farming section; each of the at least one farming section comprises an aquaculture unit, a vegetable farming unit and a water circulation unit; the aquaponics system also comprises additional aquaculture units; wherein:
   the aquaculture unit comprises an outer tank constituted by a container and an aquaculture tank inside the outer tank;
   the vegetable farming unit comprises a vegetable farming column and a water collection tank at a bottom part of the vegetable farming column;
   the water circulation unit comprises a filter tank, a water pump, and at least one guiding pipe; the entire at least one guiding pipe extends downwardly in an inclined manner from the aquaculture tank of the aquaculture unit to a top part of the vegetable farming column, but not connected to aquaculture tanks of the additional aquaculture units; a water inlet of the filter tank is connected with a water outlet of the aquaculture tank of the aquaculture unit; a water outlet of the filter tank is connected with a water inlet of the aquaculture tank of the aquaculture unit one end of the water pump is connected with the water collection tank via a water pipe, another end of the water pump is connected with the aquaculture tank of the aquaculture unit.

2. The aquaponic system as in claim 1, wherein the at least one farming section comprises multiple farming sections; outer tanks of aquaculture units of the farming sections are stackable from bottom to top; vegetable farming columns of the farming sections are also stackable from bottom to top.

3. The aquaponic system as in claim 2, wherein the additional aquaculture units are in a same quantity as the aquaculture units of the farming sections; outer tanks of the additional aquaculture units are stackable from bottom to top, and are juxtaposed beside the aquaculture units of the farming sections; the aquaculture tanks of the additional aquaculture units have water outlet ends connecting with water inlet ends of filter tanks which have water outlet ends connecting with water inlet ends of the aquaculture tanks of the additional aquaculture units; the filter tanks which have water outlet ends connecting with the water inlet ends of the aquaculture tanks of the additional aquaculture units are filter tanks in water circulation units of the farming sections which are at a same height level as the additional aquaculture units.

4. The aquaponic system as in claim 3, wherein the aquaponic system comprises two or more subsystems each constituted by plurality of the farming sections and plurality of the additional aquaculture units.

5. The aquaponic system as in claim 3, wherein the at least one guiding pipe in each of the farming sections comprises a plurality of guiding pipes.

6. The aquaponic system as in claim 5, wherein aquaculture tanks of the aquaculture units and the additional aquaculture units are provided with aeration devices which comprise aeration pipes provided in the aquaculture tanks of the aquaculture units and the additional aquaculture units and at least one blower connected with the aeration pipes.

7. The aquaponic system as in claim 6, wherein the at least one blower comprises only one blower shared by all the aeration devices of all the aquaculture tanks of the aquaculture units and the additional aquaculture units.

8. The aquaponic system as in claim 7, wherein the aquaculture tanks of the aquaculture units and the additional aquaculture units are provided with heat supply devices.

9. The aquaponic system as in claim 8, wherein the heat supply devices are electrical heating devices provided in the aquaculture tanks of the aquaculture units and the additional aquaculture units.

10. The aquaponic system as in claim 8, wherein the heat supply devices are hot water supply devices which supply hot water to the aquaculture tanks of the aquaculture units and the additional aquaculture units.

* * * * *